United States Patent [19]

Nielsen, Jr.

[11] 4,062,208
[45] Dec. 13, 1977

[54] LOCKING MEANS FOR GAS VALVES

[76] Inventor: Anker J. Nielsen, Jr., 410 Bailey Road, Holden, Mass. 01520

[21] Appl. No.: 684,671

[22] Filed: May 10, 1976

[51] Int. Cl.² .......................................... F16K 35/00
[52] U.S. Cl. ....................................... 70/178; 70/186
[58] Field of Search ................ 70/178, 177, 179, 175, 70/176, 184, 185, 186, 34, 54, 232

[56] References Cited

U.S. PATENT DOCUMENTS

| 1,003,211 | 9/1911 | Shepard | 70/178 |
| 1,459,688 | 6/1923 | Parkinson | 70/178 |
| 1,571,669 | 2/1926 | Hompe | 70/176 |
| 1,795,839 | 3/1931 | Credle | 70/175 |
| 2,016,797 | 10/1935 | Burns et al. | 70/176 |

FOREIGN PATENT DOCUMENTS

| 540,577 | 12/1931 | Germany | 70/178 |
| 1,115,063 | 10/1961 | Germany | 70/175 |

Primary Examiner—J. Franklin Foss
Attorney, Agent, or Firm—Robert K. Randall

[57] ABSTRACT

The present invention is a protective shroud to prevent unauthorized operation of a gas cock controlling the supply of gas used for industrial purposes or other large volume use. The device is fixed to the valve or cock by key-operated locking means coupling the valve stem to the body of the valve.

3 Claims, 8 Drawing Figures

LOCKING MEANS FOR GAS VALVES

The present invention aims to prevent unauthorized operation of the heavy-duty gas cocks employed in many industries which utilize gas in large quantities and rely on its supply being uninterrupted. For assurance of the needed continuity, a by-pass line auxiliary to the main supply line and equipped with a gas cock normally closed is provided for use during change of meters or repairs on the main line.

Increasing instances of tampering with these valves out of vandalism, and also by unscrupulous users to detour the meter, partially or wholly, have created a need for protection of these gas cocks from meddling. To this end, the invention provides a cover or shroud enclosing all the parts of the valve or cock capable of being manipulated to govern the flow of gas through or from the valve and preventing all access thereto, and key-operated locking means fixing such shroud immovably in place on the valve body, but quickly and easily removable to free the shroud and permit legitimate operation of the valve.

An illustrative embodiment of the invention is shown in the accompanying drawings in which FIG. 1 is a plan view of a conventional modern gas cock with the shroud in place.

Figure 1:
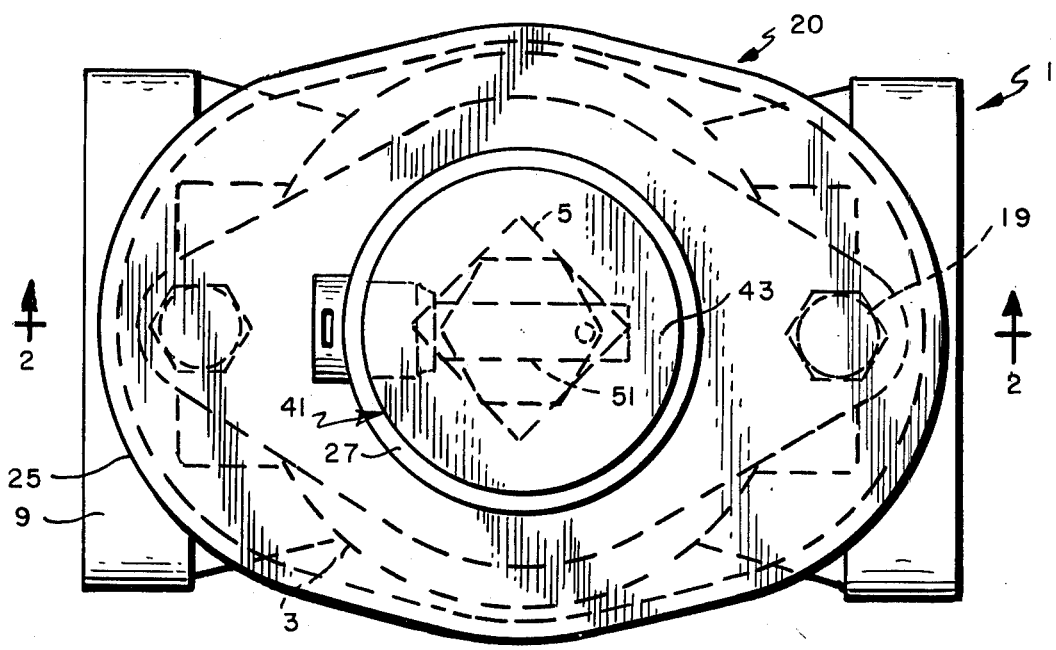

The gas cock 1 is of common design, having a transversely apertured valve-closing member or gate 2 rotatable in a tapered seat in a passageway through valve body 3 by means of stem 5 extending through packing gland 7 and squared at its upper end for rotation by means of a wrench. It is connected into the supply line by internally threaded hubs 9.

Since these valves are normally operated only at rate intervals, and are many times in exposed locations, efficient lubricating means for the rotatable inner element 2 is commonly provided by means of a screw plunger 11 threaded into an axial grease-receiving cavity 13 in the valve stem 5 having ducts 6 discharging such lubricant to the co-engaging surfaces of the valve member 2 and its seat.

In accordance with the present invention, a shroud 20 of heavy steel stock is shaped to enclose the otherwise exposed squared end of stem 5, the packing gland 7, the cap screws 19, the pressure plate 21 of the packing box, and the generally elliptical boss 23 containing the packing gland or stuffing box 7.

The elliptical skirt or bell 25 of the shroud 20 follows the contour of the valve top and reaches down close to the tops of the hubs 9 and as indicated covers the cap screws 19 of the packing box; a cylindrical tubular neck 27 is welded at 28 to the top thereof concentric with a circular aperture 29 therein and is co-extensive with the otherwise exposed portion of the stem 5 of the valve rotor. A thick-walled cylindrical continuation 31 is welded at 33 to the upper end of tubular portion 27 in concentric relation thereto. Likewise it is concentric to the stem 5 and the grease-feeding screw 11, for whose tapered face 35 a conforming beveled seat 37 is formed at the bottom end of the roomy axial passage 39 through this element.

Figure 5:
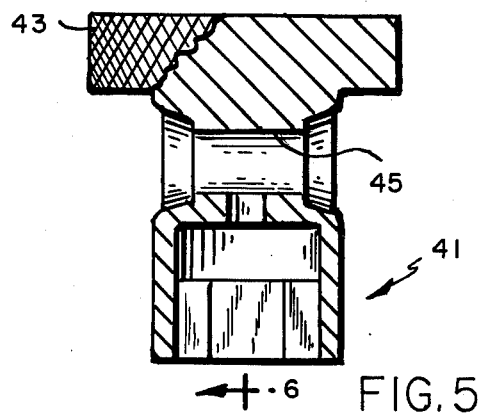
FIGS. 5 and 6 are vertical sections, 90° apart, of the wrench portion of FIG. 1.
Figure 6:
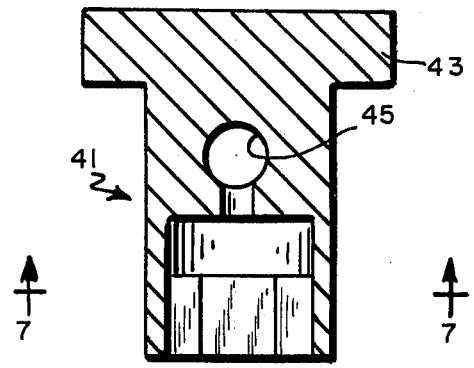
Figure 4:
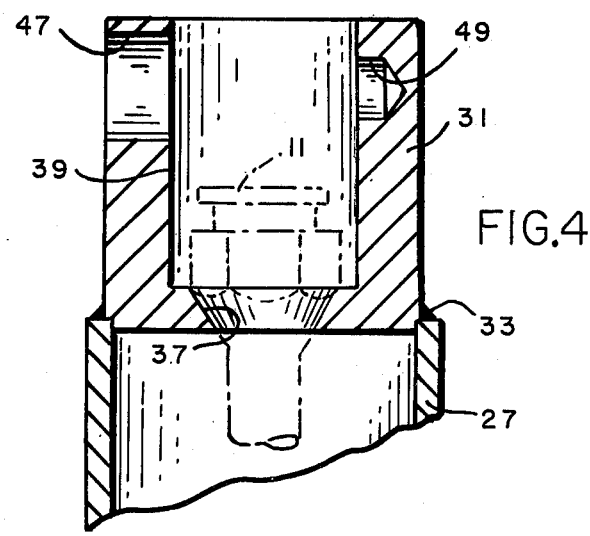
FIG. 4 shows in vertical section the upper part of the shroud without the wrench portion and lock of FIG. 1.
Figure 7:
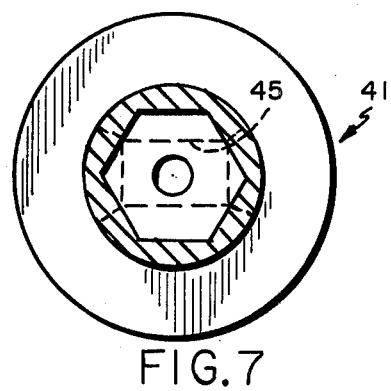
FIG. 7 is a bottom view of the wrench.

The whole shroud is secured fixedly in place on the valve body 3 by the screw 11, (which is a component of the gas valve as originally built and sold,) when such screw is driven home. This is accomplished by a socket wrench 41, FIGS. 5, 6, and 7, fitting the faceted head of screw 11, entering the bore 39 of the portion 31 and adapted to be rotated by means of its knurled head 43, either manually or with a wrench. This wrench element 41 is pierced by a diametrical bore 45, FIGS. 4, 5, and 6, which is brought into register with a radial bore 47 and its reduced aligned extension 49 in the neck 31 of the shroud when the wrench 41 has substantially completed the seating of screw 11 on seat 37.

Figure 3:
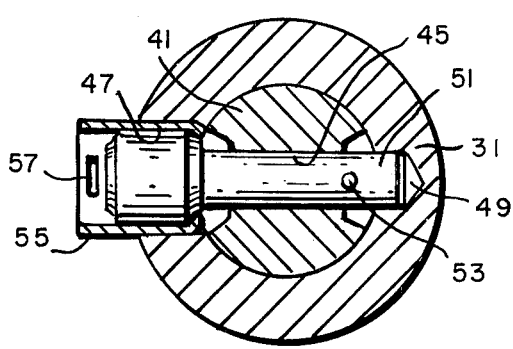
FIG. 3 is a section on line 3 — 3 of FIG. 2.
Figure 2:
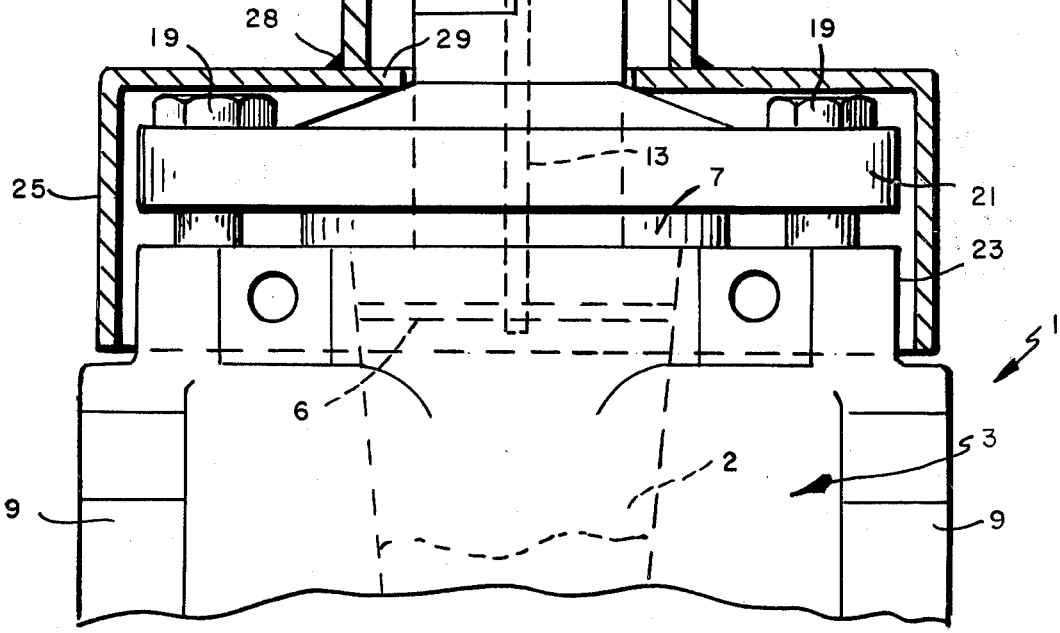
FIG. 2 is an elevation mainly in vertical section on line 2 — 2 of FIG. 1.

In this relation a bolt type lock 51, FIGS. 2 and 3, such as shown in Morse & Nielsen U.S. Pat. Nos. 3,835,674 and 3,714,802 is inserted in bore 47, through bore 45 and into the extension 49, with the locking balls 53 relaxed in well-known manner through use of the customary key (not shown). Thereupon the key is withdrawn, and the locking balls protrude and intercept the bottom of the counterbored end of the bore 45, preventing withdrawal of the bolt lock and the wrench 41.

As is now obvious, the bolt lock 51 prevents relative rotation of screw 11.

This prevents removal of the shroud 20 as must be done to give access to the valve stem 5 if the valve is attempted to be turned on or off in the intended manner. Further, the shroud also prevents another way used to open or close the valve illegitimately, in which the cap-screws 19 holding the packing gland are unscrewed allowing the whole top assembly to be released and rotated along with the valve stem, in other devices relying on locking the valve stem to the top assembly. The shroud couples the locking means from the valve stem to the body of the valve, instead of merely to the packing gland or other detachable parts. Thus this manner of effecting theft of gas, with its attendant danger of leakage, is avoided.

The heavy-walled portion 31 of the shroud effectively protects the bolt lock 51 from forcible attack. A non-corrodible metal sleeve 55, with a slot 57 for a strip seal to guard the key hole may be employed in certain instances.

When legitimate occasion to operate the valve arises, the bolt lock is unlocked by use of the key and withdrawn, freeing the socket wrench 41 to be rotated to unscrew the screw 11, thus releasing the shroud to be lifted off. The valve stem 5 is then rotated by an ordinary wrench one-quarter turn to open or close the passage through the valve as needed. Reversal of these steps of course restores the valve assembly to tamper-proof relation.

The ellipitical shape of the skirt 25 of the shroud fitting over the boss 23 and its projections bars relative rotation of the shroud about the axis of the valve stem 5. The bolt lock 51 prevents rotation of the wrench 41 to free screw 11 which fixes the shroud onto the end of the valve stem 5. The screw 11 is thus completely inaccessible as is the stem 5 of the valve rotor.

Figure 8:
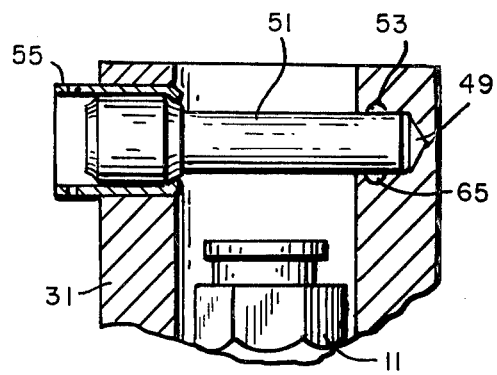
FIG. 8 is a vertical section of a modification.

A simplified and cheaper form of the invention is shown in FIG. 8, where the socket wrench 41 is omitted and the bolt lock's locking balls 53 are received in a rabbet 65 in the wall of the closed-ended socket 49 in one wall of the sleeve 31. The bolt lock 51 bars access by socket wrench to the shroud-retaining screw 11, as is obvious.

While we have illustrated and described certain forms in which the invention may be embodied, we are aware that many modifications may be made therein by any person skilled in the art, without departing from the scope of the invention as expressed in the claims. Therefore, we do not wish to be limited to the particular forms shown, or to the details of construction thereof, but What we do claim is:

1. Locking means for a gas valve having in combination a body, a rotatable valve member therein, a valve stem for rotating such member and having an axial grease duct, a shroud fitting non-rotatably on the body and having a sleeve portion enclosing the valve stem, screw means engaging in the grease duct and fixing the sleeve portion of the shroud on the end of the valve stem, driving means for the screw means closing the end of the sleeve portion, and a bolt lock extending transversely of the sleeve portion preventing rotation of the driving means.

2. Locking means for a gas valve having a body with a valve seat, a rotatable valve-closing member in the bod to engage such seat, a shroud fitting non-rotatably on the body to prevent access to such member, screw means to fix the shroud directly on the valve member with capacity for the shroud's removal to permit rotation of the valve member to control the gas flow, screw actuating means barring access to the screw means, and a bolt type lock adapted to bar relative rotation between the shroud and the screw means.

3. Locking means for a gas valve having a bod, a rotatable valve-closing member therein, a shroud fitting non-rotatably on the body, screw means fixing the shroud directly on the valve member, actuating means for the screw means, and a key-operated bolt type lock adapted to bar relative rotation between the shroud and the screw-actuating means.

* * * * *

Disclaimer

4,062,208.—*Anker J. Nielsen, Jr.,* Holden, Mass. LOCKING MEANS FOR GAS VALVES. Patent dated Dec. 13, 1977. Disclaimer filed Mar. 25, 1981, by the inventor.

Hereby enters this disclaimer to claims 1, 2 and 3 of said patent.

[*Official Gazette June 9, 1981.*]